Nov. 27, 1962    HENRY MITSUO FUKUHARA    3,065,570
SPLIT FLOWER POT
Filed Nov. 12, 1959
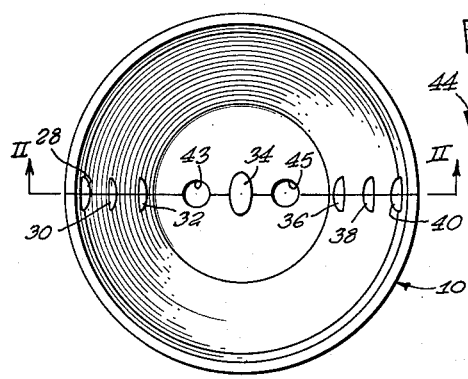
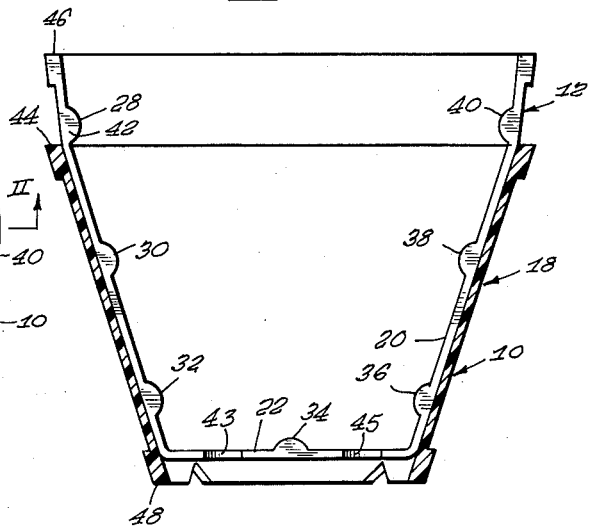
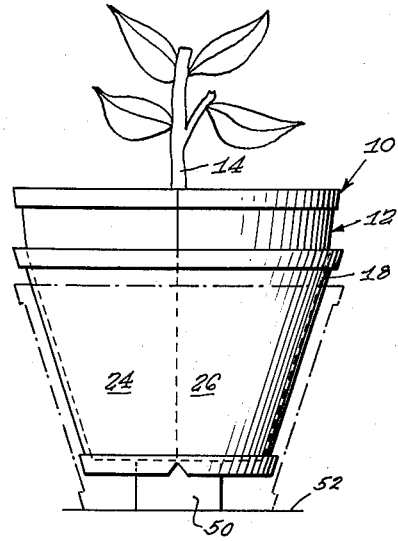
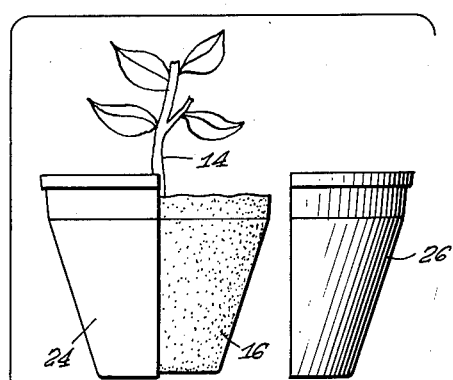
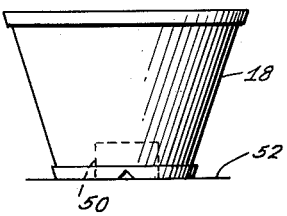
Inventor
Henry Mitsuo Fukuhara United States Patent Office 3,065,570
Patented Nov. 27, 1962

3,065,570
SPLIT FLOWER POT
Henry Mitsuo Fukuhara, 1248 W. Eddy St., Chicago, Ill.
Filed Nov. 12, 1959, Ser. No. 852,264
1 Claim. (Cl. 47—37)

This invention relates to a transplanting pot for use with plants such as flowers, and more particularly to a pot which may be readily disassembled to permit removal of the plant, but which has means for securely maintaining the pot in the assembled condition.

Previous transplanting devices of which I am aware have either been of the conventional type wherein the plant is disturbed during transplanting or have utilized a multiplicity of parts and have thus been cumbersome, unwieldy and difficult to assemble.

The present invention overcomes these difficulties by providing a device for seedlings which are to be transplanted, such as flowers or the like, wherein a pot is formed of two pieces each of which preferably forms a half of the assembled article. In order to support the pot in assembled condition, an annular shell of complementary cross-sectional configuration is provided having an elongated axial dimension and tapering at an angle corresponding to the taper of the side wall structure of the pot. The upper end of the support annulus thus formed preferably has a diameter less than the diameter of the upper end of the split pot structure and a lower end with a diameter less than the diameter of the lower end of the pot, so that the pot may be inserted therein and the annulus may press firmly against the sides of the pot for substantially the entire interface thereof to afford a secure assembly of the halves of the pot in mating engagement. When thus assembled, the bottom edge of the support annulus or band desirably extends below the bottom surface of the pot for a predetermined distance, the said bottom surface preferably having apertures formed therein for drainage or the like in a conventional manner. In order to facilitate placing the halves of the pot in the said mating engagement, and to maintain a secure alignment therebetween after assembly, it is preferred to form the pot with boss structures which are intersected by the split in the pot so that the internal faces of the boss structures engage in abutting relationship.

Accordingly, it is an object of the present invention to provide a transplanting pot for use in raising seedlings which is extremely simple in construction and may be formed of only three parts.

Another object of the invention is to provide a device as described wherein the pot is split diametrically and axially and support means are provided therefor comprising a band adapted to maintain the split halves in assembled mating engagement.

Another object of the invention is to provide a device as described wherein the band is formed so as to engage the exterior surfaces of the pot substantially along the entire interface between the pot and the band so that stable support is afforded over a major portion of the surface of the pot.

Another object of the invention is to provide a device as described wherein the band extends downwardly below the bottom surface of the pot and provides a bottom support edge.

Another object of the invention is to provide a device as described which is attractive and economical and which may be assembled or knocked down with ease and with no previous experience on the part of the operator or any need for special techniques.

Other objects and advantages of the invention will become apparent as the description proceeds in accordance with the drawings in which:

On the drawings:
FIGURE 1 is a top plan view of a pot according to the present invention;
FIGURE 2 is a vertical sectional view taken along the lines II-II of FIGURE 1;
FIGURE 3 is a side elevational view of a pot according to the invention in assembled condition; and
FIGURE 4 is an exploded view of the pot of the invention in disassembled or knocked-down condition.

Referring now to the drawings, a pot 10 is shown according to the present invention which comprises a pot structure 12 for receiving plants such as indicated by reference numeral 14 which are planted in soil or the like 16, and a band or support structure 18 receiving the pot 12 in nested, supporting relationship therein. Desirably, both the pot structure 12 and the support band 18 are formed of a suitable plastic, such as polystyrene or the like, although it will be understood that other materials such as thin gauge metal may be used within the scope of the invention.

The pot structure 12 has an upwardly and outwardly tapering side wall 20 and a bottom wall 22. In accordance with the invention, the entire pot is split vertically and axially along a plane extending diametrically through the pot, it being noted that although the pot is of circular cross-sectional configuration in the embodiment shown, although it will be understood that other shapes may also be utilized.

In order to afford ready assembly of the halves 24 and 26 of the pot thus formed, the interior surfaces of the pot are desirably provided with bosses or the like such as are indicated by reference numerals 28, 30, 32, 34, 36, 38 and 40. These bosses are aligned along the plane of division of the pot structure 12, and thus provide internal faces as indicated at 42 which are substantially planar and adapted to come into abutting relationship when the sides 24 and 26 are engaged in mating relationship as shown in FIGURE 1. The bottom wall 22 of the pot is preferably apertured as designated by numerals 43 and 45, also along the said plane of division.

The band or support structure 18 desirably has a relatively large axial dimension and a cross-sectional configuration complementary to that of the pot structure 12. The invention contemplates the provision of a firm and secure support along a major portion of the exterior surface of the pot and to this end, the band 18 is tapered at an angle corresponding to the angle of taper for the side wall 14 of the pot. Accordingly, when the pot is received within the support band as shown in FIGURE 2, substantially the entire interface of the pot and the band is disposed in abutting engagement such that any tendency of the pot halves 24 and 26 to become misaligned will be overcome. Furthermore, the taper of the support band affords a stop so that insertion of the pot 12 into the support or band 18 is relatively easy and the nested or seated condition is attained without difficulty.

The upper end 44 of the band 18 has a diameter which is preferably somewhat less than the diameter of the upper end 46 of the pot structure 12, although it will be understood that this characteristic is not an essential feature of the invention. However, it is desirable that the lower end 48 of the band 18 extend substantially below the bottom wall 22 of the pot, and the lower end 48 therefore has a diameter which is preferably less than the minimum diameter of the pot.

In disassembling the structure 10 of the invention, a suitable small block 50 or the like may be placed on a support surface 52, and the pot structure 10 may be pressed downwardly on the block so that the pot structure 12 is moved axially upwardly relative to the band 18, as shown in FIGURE 3. Thereupon, the halves 24 and 26 may be easily drawn away from the body of soil 16 in which the plant is rooted, and the soil together with the imbedded plant may be transplanted intact and without any disruption of the roots.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

In combination with a pair of pot halves of rigid material having mating edges engageable to define a pot having an inverted substantially frusto-conical side wall and a bottom wall with said mating edges being in the plane of the central axis of the pot so defined, the improvement which comprises a rigid support band for surrounding and holding said pot halves together, said rigid support band having an inside surface of inverted substantially frusto-conical shape having the same rate of taper as that of the outer surface of said side wall of said pot, with the inside transverse dimension of the lower end of said band being less than the outside transverse dimension of the lower end of said side wall, whereby said bottom wall is positioned above the lower end of said band and said mating edges are held in tightly sealed engagement by wedging action between said band and said pot halves with the aid of gravity acting on said pot halves.

References Cited in the file of this patent

UNITED STATES PATENTS

| | | |
|---|---|---|
| 357,698 | Burrough | Feb. 15, 1887 |
| 584,433 | Walker | June 15, 1897 |
| 610,156 | Mechwart et al. | Aug. 30, 1898 |
| 802,460 | Marshall | Oct. 24, 1905 |
| 1,951,642 | Augustin et al. | Mar. 20, 1934 |